United States Patent [19]
Angioletti et al.

[11] 3,900,627
[45] Aug. 19, 1975

[54] CONVEYOR BELT

[75] Inventors: Attilio Angioletti; Aurelio Brollo, both of Milan, Italy

[73] Assignee: Industrie Pirelli S.p.A., Milan, Italy

[22] Filed: Dec. 14, 1972

[21] Appl. No.: 314,983

[30] Foreign Application Priority Data
- Dec. 17, 1971 Italy................................... 32524/71
- Nov. 2, 1972 France............................... 72.38752
- Oct. 10, 1972 Netherlands....................... 7213693

[52] U.S. Cl. ............... 428/114; 161/156; 161/166; 198/193; 428/213; 428/232
[51] Int. Cl............................................. B32b 5/12
[58] Field of Search............ 161/60, 78, 91, 92, 98, 161/144, 152, 156, 166; 198/193

[56] References Cited
UNITED STATES PATENTS

| | | | |
|---|---|---|---|
| 2,633,227 | 3/1953 | Hutchins............................... | 161/60 |
| 2,698,032 | 12/1954 | Bacon................................... | 161/144 |
| 2,850,420 | 9/1958 | Hacker................................. | 161/60 |
| 3,122,934 | 3/1964 | Fihe..................................... | 161/144 |
| 3,221,869 | 12/1965 | Paasche............................... | 161/144 |
| 3,485,707 | 12/1969 | Spicer................................... | 198/193 |
| 3,574,022 | 4/1971 | Lampert............................... | 198/193 |
| 3,642,561 | 2/1972 | Grobner................................ | 161/92 |

*Primary Examiner*—George F. Lesmes
*Assistant Examiner*—William R. Dixon, Jr.
*Attorney, Agent, or Firm*—Stevens, Davis, Miller & Mosher

[57] ABSTRACT

A natural or synthetic rubber or other elastomeric or plastic conveyor belt is reinforced with an embedded fabric layer disposed on each side of at least one layer of coplanar substantially parallel cords having their axis extending along the greatest dimension of the belt. A layer of elastomer or plastic is interposed between each fabric layer and the adjacent layer of cords and the ratio between the thickness of each layer of elastomer or plastic and the diameter of one cord is smaller than 0.166 and the ratio between the distance between two adjacent cords, measured between their axes, and the diameter of one cord is from 1.5 to 6, so as to obtain an optimum flexibility and fatigue resistance.

6 Claims, 4 Drawing Figures

PATENTED AUG 19 1975 3,900,627

CONVEYOR BELT

This invention relates generally to reinforced elastomeric or plastic belts and more particularly to a fabric reinforced conveyor belt of improved flexibility and fatigue resistance.

A conveyor belt is usually composed of rubber or other elastomeric or plastic material reinforced with embedded fabric, wire or the like to improve its resistance to mechanical stresses. The particular structure of the belt may be varied depending upon the particular use to which it will be put. Some of the known belts are composed of one or more layers of parallel and coplanar cords in various combinations with layers of woven fabrics and layers of elastomer or plastic therebetween. The reinforcing structure of the conveyor belt must withstand mechanical stresses applied to the belt as it is used. Moreover, the reinforcing materials must not unduly impair the flexibility and resistance of the belt to fatigue. Optimum flexibility and fatigue resistance would be obtained by arranging the whole reinforcement at the neutral plane of the conveyor belt. However, since the neutral plane is a geometrical entity and, as such, has no thickness, the entire reinforcing material cannot, in practice, be arranged in the neutral plane. This is true when a single reinforcing layer of cords or fabric is used or when a more complex structure of a plurality of layers of cords and/or fabric are combined with interposed layers of elastomer or plastic.

It is known that a complex reinforcing layer has a greater resistance to impact but is less flexible and less resistant to fatigue than a single layer of reinforcing material. This is because the elements of the reinforcing structure are more rigid than the elastomeric material of the belt and because they are at a distance from the neutral plane of the section.

It has been proposed before to make conveyor belts having a complex structure of a layer of coplanar cords parallel to each other sandwiched between two layers of square woven fabric or between two layers of cord fabrics composed of threads disposed transversely or on the bias with respect to the band. Such belts are usually provided with a layer of elastomer between each layer of fabric and layer of cords. Such belts are used as driving V-belts and also as conveyor belts. However, in the prior art belts, the minimum thickness of the reinforcing layers is always rather high because of the great thickness of the layers of the elastomer or plastic interposed therebetween. The interposed layers of elastomer or plastic have in fact a thickness which is always greater than one-sixth of the diameter of the cords. If values lower than this are used, the life of the belt is relatively short because of separation of the various plies. Consequently, the prior art belts have a low flexibility and a poor fatigue resistance.

An object of this invention is to provide a reinforced elastomeric or plastic conveyor belt having increased flexibility, improved fatigue resistance and long service life. Still another object of the invention is to provide a conveyor belt having a plurality of layers of fabric and cord reinforcing layers embedded in an elastomer or plastic and having optimum flexibility and improved fatigue resistance.

Other objects will become apparent from the following description with reference to the accompanying drawing wherein FIG. 1 is a perspective view, partially broken away, of a portion of one embodiment of the invention;

Generally speaking, a conveyor belt is provided in accordance with this invention with a reinforcing structure having at least one layer of a plurality of coplanar cords parallel to one another and arranged along the larger dimension of the belt, two layers of fabric arranged with one on each side of the layer of cords, and a layer of elastomer or plastic interposed between the layer or layers of cords and fabrics. The ratio between the thickness of the interposed layer of elastomer or plastic and the diameter of one of the cords is smaller than 0.166 and the ratio between the distance between two adjacent cords, measured between their axis, and the diameter of one cord ranges from 1.5 to 6. Such a structure produces a conveyor belt having optimum flexibility and fatigue resistance.

Figure 1:
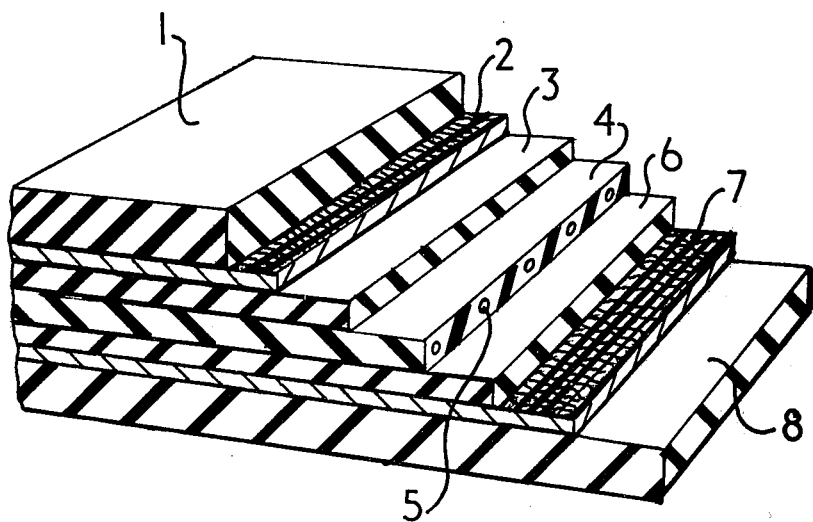
Figure 2:
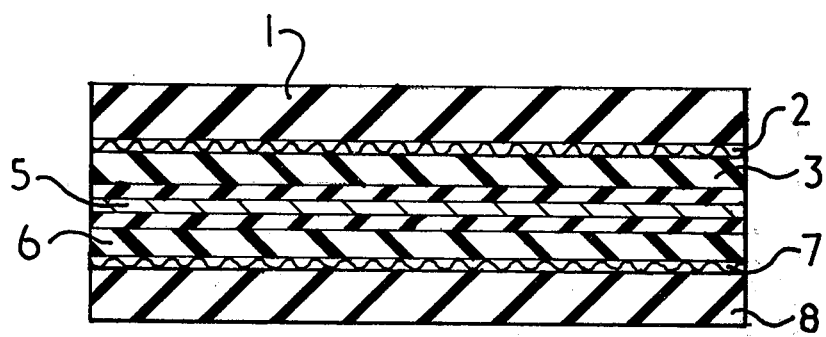
FIG. 2 is a longitudinal section of the belt of FIG. 1.
Figure 3:
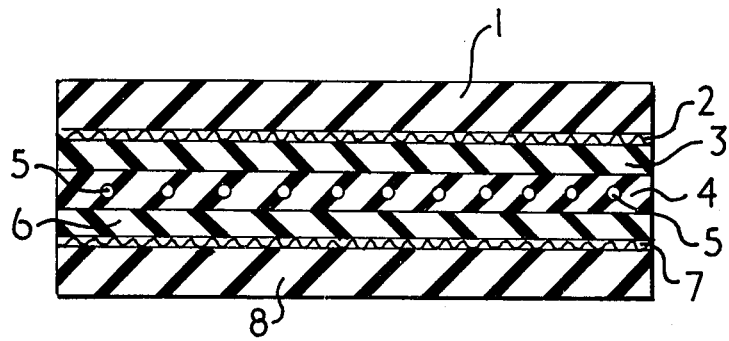
FIG. 3 is a cross-section of the conveyor belt of FIG. 1.

Referring now to the drawing, a conveyor belt according to the invention is illustrated in FIG. 1 and is composed of a plurality of different layers joined together.

From the upper face of the conveyor belt, the layers are: at first a layer 1 of elastomeric or plastic material; a layer 2 of fabric, which can be a square woven fabric or a cord fabric with its threads arranged transversally or on the bias with respect to the conveyor belt; a layer 3 of elastomeric or plastic material; a layer 4 formed by coplanar cords 5 parallel to one another, arranged along the larger dimension of the conveyor belt and embedded in elastomeric or plastic material; a layer 6 of elastomeric or plastic material; a layer 7 of fabric which may be a square woven fabric or a cord fabric with its threads arranged transversally or on the bias with respect to the conveyor belt; and a layer 8 of elastomeric or plastic material disposed at the other face of the conveyor belt.

Figure 4:
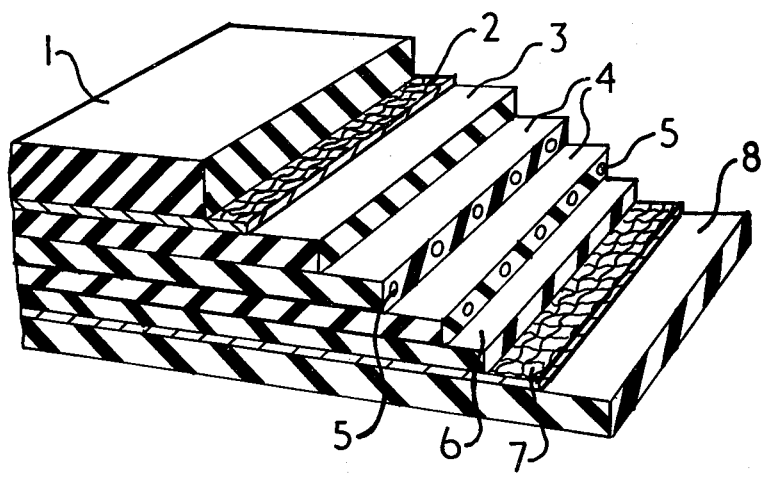
FIG. 4 is a perspective view, partially broken away, of a portion of another embodiment of the invention.

The conveyor belt according to the alternative embodiment represented in FIG. 4 differs from that illustrated in FIG. 1 only by having two layers 4 of cords 5 directly joined to each other.

The features of the single layers which, joined together, form the conveyor belt, are the following:

The layers disposed at the faces of the conveyor belt, namely layers 1 and 8, may be any suitable elastomeric or plastic material and can differ in thickness. In particular, the thickness of layer 1 is generally greater than the thickness of layer 8, since layer 1 is the one which comes into contact with the material to be transported, and is therefore subjected more to abrasion and tearing actions exerted by the transported material than layer 8 and, in course of time, suffers a greater reduction of its thickness.

As regards the nature of the elastomeric or plastic material forming layers 1 and 8, it is preferably, but not exclusively the same for both layers, and is related to the nature of the material to be transported. For instance, if the conveyor belt is intended to transport hot materials, layers 1 and 8 will have such a recipe as to withstand high temperatures; these recipes are known to those skilled in the art.

As said above, layers 2 and 7 are constituted by a fabric which can be a square woven fabric or a cord fabric, with its threads arranged transversally or on the bias with respect to the conveyor belt. If layers 2 and 7 are a square woven fabric, the warp threads are arranged along the larger dimension of the conveyor belt, and are therefore parallel to cords 5 of layer 4. The weft threads are perpendicular to the warp threads, and are therefore arranged transversally to the conveyor belt.

For the purposes of this invention, it is important for the warp threads of the fabric layers 2 and 7 to have an extensibility much greater than that of cords 5; at the limit, said warp threads are no longer existing when the fabric forming layers 2 and 7 is a cord fabric.

As regards the weft threads of the fabric layers 2 and 7, they must have an extensibility smaller than that of the warp threads, since they have the task of withstanding any action which tends to vary the pitch of the cords, because of localized impacts. In other words, the extensibility of the weft threads must be greater than that of the cords in order to avoid excessive stiffening of the conveyor belt.

As regards the materials, it is preferable for the cords to be of polyester, for the warp threads of the fabric layers 2 and 7 to be of nylon, and for the weft threads of said layers to be of cotton/nylon or nylon. If layers 2 and 7 are made of cord fabric, the threads forming said fabrics must preferably be of cotton/nylon or nylon.

Anyhow, whichever is the material forming the fabrics and the cords, the ratio between the modulus of elasticity of the layers in the direction of the larger dimension of the conveyor belt and the modulus of elasticity of the cords, under any working load of the conveyor belt, is smaller than or equal to $16 \times 10^{-3}$ (namely not higher than this value), and preferably ranges between $6.5 \times 10^{-3}$ and $1.2 \times 10^{-3}$.

As said above, layers 3 and 6 are made of elastomeric or plastic material. The nature of the elastomeric or plastic materials forming layers 3 and 6 is different from that of layers 1 and 8, since the task committed to layers 3 and 6 is different from that of layers 1 and 8.

In fact, layers 3 and 6 have the function of providing a safe connection between layers 2 and 7 and layer 4 which contains cords 5.

Consequently, the elastomeric or plastic material forming layers 3 and 6 must have a low hysteresis, must resist tear and must provide an efficient bonding with the fabric of layers 2 and 7; materials of this kind are well known to the technicians of this field. For the purposes of the present invention, the main feature to be possessed by layers 3 and 6 regards their thickness. Said thickness must not exceed a value of 0.166 times the diameter of any cord 5 of layer 4. The reasons of this fact will be explained herebelow.

Layer 4 is composed of a plurality of coplanar cords 5, parallel to one another and arranged along the larger dimension of the conveyor belt. Cords 5 are embedded in elastomeric or plastic material in such a way that the thickness of said layer 4, contrary to what it might be deduced from the drawings, is practically equal to the diameter of one cord.

The nature of the elastomeric or plastic material embedding cords 5 can be the same as that of layers 3 and 6. If it is not, the nature of the elastomeric or plastic material forming these layers must be such as to insure the best possible adhesion between layer 4 and layers 3 and 6. For the purposes of the present invention, layer 4 must have the following features. The pitch of the cords, namely the distance between two adjacent cords, measured between the axes of the cords, must be selected among values comprised in the interval whose limits are 1.5 times the diameter of one cord and six times the diameter of one cord, and it must be preferably ranging in an interval whose limits are 2.4 times the diameter of one cord and five times the diamter of one cord.

Moreover, as already pointed out, the ratio between the modulus of elasticity of the layers in the direction of the larger dimension of the conveyor belt and the modulus of elasticity of the cords, whichever is the working load of the conveyor belt, must be lower than $16 \times 10^{-3}$ and preferably must be between $6.5 \times 10^{-3}$ and $1.2 \times 10^{-3}$.

The explanation of the reason why, by means of these values, in association with the thickness values previously indicated for layers 3 and 6, it is possible to obtain a considerable improvement in the characteristics of flexibility, fatigue resistance and adhesion between the layers constituting the conveyor belt, will be given herebelow.

In a conveyor belt, the maximum flexibility is obtained when its reinforcing structure is completely contained in the neutral plane. As already pointed out, this is impossible both in the case of conveyor belts having a simple reinforcing structure, namely one composed of one layer of coplanar and parallel cords, and, even more so, when the resistant structure is a plurality of reinforcing layers joined together. Moreover, if the reinforcing structure is complex, namely is formed by a plurality of reinforcing layers, it is necessary that the layers not separate during the service life of the conveyor belt.

Further, if the reinforcing structure is formed by a plurality of layers, it is necessary to insure that said layers do not wear by rubbing with one another.

For the two above reasons, resort is had to the interposition of layers of elastomeric or plastic material between the layers forming the reinforcing structure of the conveyor belt.

In the prior art conveyor belts, a lower limit has been established for the thickness of the interposed layers of elastomeric or plastic material in order to avoid any possible detachment between the reinforcing layers. In this way, the flexibility of the conveyor belt, and therefore its fatigue resistance, have been reduced.

In the prior art conveyor belts, if the layers of elastomeric or plastic material sandwiched between the reinforcing layers constituting the reinforcing structure have a thickness smaller than that admitted as minimum limit, the reinforcing layers detach rapidly from one another, so that the conveyor belt is made unserviceable in a short time.

In a conveyor belt according to the present invention, it is neccessary to provide layers of elastomeric or plastic material sandwiched between the reinforcing layers forming the reinforced structure of the conveyor belt; however, for such layers of elastomeric or plastic material a maximum value has been established which is equal to the minimum value of thickness admitted for the same layers of conventional conveyor belts.

In this way, a conveyor belt is obtained which has a complex reinforcing structure whose total thickness is sufficiently small, and therefore a conveyor belt possessing a high flexibility and a considerable fatigue resistance, but in which, surprisingly, the cited phenomena of detachment between the resistant layers does not occur and the layers do not wear by rubbing one on the other.

This is probably due to the fact that cords 5 of layer 4 are situated at a certain mutual distance, so that the elastomeric or plastic material of layer 4 adheres perfectly, in a permanent way, in particular in the portions comprised between adjacent cords 5, to the layers 3 and 6 of elastomeric or plastic material joined to it.

Moreover, as the fabrics forming layers 2 and 7 have an extensibility, in the direction of larger development of the conveyor belt, which is by far greater than that of the cords, the flexibility and the fatigue resistance of the conveyor belt are increased, and the adhesion between all the layers constituting the conveyor belt is remarkably improved.

In fact, the high extensibility of the fabric layers 2 and 7 in the direction of the larger dimension of the conveyor belt gives rise to a greater flexibility and to a better fatigue resistance of the layers, and consequently to a greater flexibility and a better fatigue resistance of the conveyor belt.

Although the invention has been described in detail for the purpose of illustration, it is to be understood that such detail is solely for that purpose and that variations can be made therein by those skilled in the art without departing from the spirit and scope of the invention except as it may be limited by the claims.

What is claimed is:

1. A conveyor belt comprising a layer of elastomeric material, at least one layer of coplanar cords embedded in the said elastomeric material and disposed parallel to one another and arranged along the larger dimension of the belt, the diameter of the cords being substantially equal to the thickness of the elastomeric material layer, a layer of fabric disposed on each side of the layer of cords, an elastomeric material disposed between each fabric layer and the adjacent layer of cords and a cover layer of elastomeric material disposed at each face of the conveyor belt, said fabrics having their warp threads arranged along the larger dimension of the conveyor belt and their weft threads arranged transversely to the conveyor belt, said warp threads having an extensibility greater than that of the cord, said weft threads having an extensibility less than that of the warp threads, the ratio of the thickness of the layers of elastomeric material disposed between the fabric and said layer of cords to the diameter of said cords being less than 0.166, and the ratio of the distance between the axes of two cords and the diameter of one cord ranging between 1.5 and 6.

2. The conveyor belt of claim 1 wherein the ratio between the distance between two adjacent cords and the diameter of one cord is from 2.4 to 5.

3. The conveyor belt of claim 1 wherein the ratio between the modulus of elasticity of the fabric in the direction of the larger dimension of the conveyor belt and the modulus of elasticity of the cords is smaller than $16 \times 10^{-3}$.

4. The conveyor belt of claim 1 wherein the ratio between the modulus of elasticity of the fabric in the direction of the larger dimension of the conveyor belt and the modulus of elasticity of the cords is from $6.5 \times 10^{-3}$ to $1.2 \times 10^{-3}$.

5. The conveyor belt of claim 1 wherein two layers of spaced cords are abutted against each other.

6. The conveyor belt of claim 9 wherein said cover layers are free from cords.

* * * * *